(12) United States Patent
Tong

(10) Patent No.: US 6,759,481 B2
(45) Date of Patent: Jul. 6, 2004

(54) SHAPE MEMORY STYRENE COPOLYMER

(76) Inventor: Tat Hung Tong, 5025 Worchester Dr., Dayton, OH (US) 45431

( * ) Notice: Subject to any disclaimer, the term of this patent is extended or adjusted under 35 U.S.C. 154(b) by 0 days.

(21) Appl. No.: 10/056,590

(22) Filed: Jan. 24, 2002

(65) Prior Publication Data

US 2002/0137864 A1 Sep. 26, 2002

Related U.S. Application Data

(60) Provisional application No. 60/263,986, filed on Jan. 24, 2001.

(51) Int. Cl.$^7$ .......................... C08L 47/00; C08L 236/20
(52) U.S. Cl. ....................... 525/241; 525/203; 525/222; 525/223; 525/225; 525/240; 525/279; 525/303; 525/306; 526/265; 526/320; 526/322; 526/326; 526/331; 526/336; 526/347
(58) Field of Search ................................ 525/222, 279, 525/306, 241, 203, 223, 225, 240; 526/322, 347, 336, 265, 320, 326, 331

(56) References Cited

U.S. PATENT DOCUMENTS

| | | | | |
|---|---|---|---|---|
| 3,383,336 A | * | 5/1968 | Kuyama et al. | ........ 526/336 X |
| 5,189,110 A | | 2/1993 | Ikematu et al. | |
| 5,506,300 A | | 4/1996 | Ward et al. | |
| 5,814,705 A | | 9/1998 | Ward et al. | |
| 5,880,240 A | * | 3/1999 | Tsuno | .......................... 526/334 |
| 6,022,550 A | * | 2/2000 | Watanabe | ............... 525/388 X |
| 6,160,084 A | | 12/2000 | Langer et al. | |

FOREIGN PATENT DOCUMENTS

| | | |
|---|---|---|
| JP | 6317995 | 7/1988 |
| WO | WO 99/46327 A1 | 9/1999 |

OTHER PUBLICATIONS

Arthur Lendlein et al., "AB–Polymer networks Based on Oligo(caprolactone) Segmenets Showing Shape–Memory Properties", PNAS, Jan. 30, 2001, 842–847, vol. 98, No. 3.

Fengkui Li et al., "Studies of Thermally Stimulated Shape Memory Effect of Segmented Polyurethanes", J. Appl. Poly, Sci., 1997, 1511–1516, '64, John Wiley & Sons.

J. R. Lin et al., "Study of Shape–Memory Behavior of Polyether–Based Polyurethanes; Influence on Hard–Segment Content", J. Appl. Polym Sci., 1998, 1563–1574, 69, John Wiley & Sons.

Fenkui Li et al., "Shape Memory Effect of Ethylene–Vinyl Acetate Copolymers", J. Appl., Sci., 1999, 1063–1070, 71, John Wiley & Sons.

Yoshiaru Kagami et al., "Shape Memort behaviors of Crosslinked Copolymers Containing Stearyl Acrylate", Macomol. Rapid Commun., 1996, 539–543, 17, Huthig & Wepf Vertag Zug.

H. Tubushi et al., "Deformation Properties of Polyurethane Shape Memory Polymers", Proceedings of the First International Conference on Shape Memory and Superelastic Technologies, 1994, 109–114.

Richard F. Gordon, "Applications of Shape memory Polyurethanes", Proceedings of the First International Conference on Shape Memory and Superelastic Technologies, 1994, 115–120.

Han Mo Yeong et al., "Shape Memory Polyurethane Containing Amorphous Reversible Phase", J. Mat. Sci., 2000, 1579–1583, 35, Kluwer Academic Publishers.

Han Mo Yeong et al., "Temperature Sensitive Water Vapour Permeability and Shape Memory Effect of Polyurethane With Crystalline Reversible Phase and Hydrophilic Segments", Polym. In., 2000, 1714–1721, 49.

J. R. Lin et al., "Shape Memory Crosslinked Ester–Type Polyurethane and Its Mechanical Viscoelastic Model", J. Appl. Poly. Sci., 1999, 1305–1319, 73, John Wiley & Sons.

USSN 10/056,773 entitled "Shape Memory Contact Lens Mold", Hofmann et al., filed Jan. 24, 2002.

PCT International Search report, Jun. 5, 2002.

* cited by examiner

Primary Examiner—Fred Teskin

(57) ABSTRACT

A shape memory polymer which is a reaction product of styrene, a vinyl compound, a multifunctional crosslinking agent and an initiator. The shape memory polymer has particular application as a contact lens mold.

23 Claims, No Drawings

SHAPE MEMORY STYRENE COPOLYMER

CROSS REFERENCE TO RELATED APPLICATION

This application claims priority from provisional applications, Serial No. 60/263,986, filed Jan. 24, 2001, which application is incorporated herein by reference.

BACKGROUND OF THE INVENTION

1. Field of the Invention

The present invention is directed to a shape memory polymer which comprises a reaction product of styrene, a vinyl compound, a multifunctional crosslinking agent and an initiator. More specifically, the present invention is drawn to a shape memory polymer thermosetting resin having compatibility with polymers employed as contact lens and thus having particular utility as contact lens molds in the fabrication of contact lens.

2. Background of the Prior Art

In recent years contact lens usage has grown tremendously. This has occasioned a corresponding escalation in development of contact lens manufacturing capacity. This development in manufacturing capacity has been accompanied by manufacturing developments which have resulted in many manufacturing improvements, including improvements in the critical step of forming the actual contact lens.

The current method of forming a contact lens is by molding in which outer male and female metal inserts, fabricated by such methods as diamond point turning to ensure a very smooth surface, accommodate male and female plastic molds. The contact lens is actually molded between plastic male and female mold members. It is this aspect of contact lens production that is the subject of the present invention.

Although the use of plastic mold members eliminates many contact lens quality problems, this solution is presently accomplished at high manufacturing cost. Specifically, the contact lens demolding step involves the insertion of pry fingers between male and female mold members. When the pry fingers are forced apart, the mold members separate. This technique, however, sometimes causes edge tears or chips to form on the contact lens mold members resulting in the subsequent production of unacceptable contact lens.

Yet another inadequacy of present contact lens molds is the elevated thermodynamic conditions under which they are fabricated. Current contact lens mold fabrication is accomplished by injection molding, conducted at high temperature and pressure. A reduction in contact lens mold forming temperature and pressure would reduce manufacturing cost and, at the same time, produce better quality contact lens.

In addition to the aforementioned production problems associated with the manufacture of any specific contact lens design, it must be appreciated that current manufacturing costs associated with the "made-to-order" nature of contact lens manufacture are quite high. A large number of injection molding inserts, one type of insert for each type of eye correction: power, cylinder and axis, must be provided. In addition, further custom contact lens manufacturing operations, including adapting the lens to corneal topography or correction of wavefront aberration, require additional inserts.

This need to fabricate a very great number of metal inserts is a costly and time consuming process. Additionally, considerable time and cost are expended in changing metal inserts during production runs. Thus, it is apparent that a pressing need exists in the art for improvement in contact lens molding techniques.

The modification of tool shapes used to form contact lens is appreciated in the art. U.S. Pat. No. 6,086,204 discloses a heated die that can change its shape to make thermoplastic contact lens. Of course, this development does not address the particular problems addressed above. Not only is die fabrication far removed from mold fabrication but, moreover, the adjustable shaped die of the '204 patent is not employable in the manufacture of thermosetting contact lens.

Shape memory polymers (SMPs) were developed about 20 years ago and have been the subject of commercial development in the last 10 years. SMPs derive their name from their inherent ability to return to their original "memorized" shape after undergoing a shape deformation. SMPs that have been performed can be deformed to any desired shape below or above its glass transition temperature ($T_g$). If it is below the $T_g$, this process is called cold deformation. When deformation of a plastic occurs above its $T_g$, the process is denoted as warm deformation. In either case the SMP must remain below, or be quenched to below, the $T_g$ while maintained in the desired thermoformed shape to "lock" in the deformation. Once the deformation is locked in, the polymer network cannot return to a relaxed state due to thermal barriers. The SMP will hold its deformed shape indefinitely until it is heated above its $T_g$, whereat the SMP stored mechanical strain is released and the SMP returns to its performed state.

Several polymer types exhibit shape memory properties. Probably the best known and best researched polymer type exhibiting shape memory polymer properties is polyurethane polymers. Gordon, Proc of First Intl. Conf. Shape Memory and Superelastic Tech., 115–120 (1994) and Tobushi et al., Proc of First Intl. Conf. Shape Memory and Superelastic Tech., 109–114 (1994) exemplify studies directed to properties and application of shape memory polyurethanes. Another polymeric system based on crosslinking polyethylene homopolymer was reported by S. Ota, Radiat. Phys. Chem. 18, 81 (1981). A styrene-butadiene thermoplastic copolymer system was also described by Japan Kokai, JP 63-179955 to exhibit shape memory properties. Polyisoprene was also claimed to exhibit shape memory properties in Japan Kokai JP 62-192440. Another known polymeric system, disclosed by Kagami et al., Macromol. Rapid Communication, 17, 539–543 (1996), is the class of copolymers of stearyl acrylate and acrylic acid or methyl acrylate. Other SMP polymers known in the art includes articles formed of norbornene or dimethaneoctahydronapthalene homopolymers or copolymers, set forth in U.S. Pat. No. 4,831,094.

A new use of shape memory polymers has recently been identified. This use us as the material of construction of contact lens molds employed in the fabrication of contact lenses. Copending application, U.S. Ser. No. 10/056,773, filed concurrently with the present application, incorporated herein by reference, describes this new utility. Additionally, shape memory polymers can be employed in an agile mold as the molding surface of the agile mold as described in Ser. No. 10/056,773, and in U.S. Ser. No. 09/649,635 incorporated herein by reference.

Suffice it to say, shape memory polymers of the prior art, were not designed to accommodate the special requirements associated with the efficient operation of a contact lens mold. Therefore, this new application of shape memory polymers portends a significant need in the art for a new shape memory polymer useful in this application.

BRIEF SUMMARY OF THE INVENTION

A new shape memory polymer has now been developed finding particular application in the manufacture of contact lens. Specifically, the shape memory polymer of the instant invention is particularly compatible with the polymers of which the contact lens are made.

In accordance with the present invention a new class of shape memory polymers, useful in the manufacture of contact lens molds, is provided. This new SMP is prepared from a reaction product of styrene, a vinyl compound other than styrene, a multifunctional crosslinking agent and an initiator.

DETAILED DESCRIPTION

The present invention uniquely employs shape memory polymers as the material of construction of mold members in the manufacture of contact lens. Shape memory polymers having the properties discussed earlier may be utilized in the formation of contact lens mold members. Thus, shape memory polymers, which include norbornene homopolymers and copolymers of norbornene and alkylated, cyano, alkoxylated, mono- or diesterified imides or carboxylic acid derivatives may be employed. In addition, the copolymer may include, as a comonomer, dimethaneoctahydronapthalene (DMON). Alternatively, homopolymers of DMON, and well as copolymers of DMON and styrene, acenapthalene or dicyclopentadiene, which may be hydrogenated or halogenated, may be employed.

Although these known shape memory polymers are within the contemplation of the present invention, it is preferred that the shape memory polymer, employed in the formation of the contact lens of the present invention, be a new SMP, a copolymer of styrene and a vinyl compound other than styrene.

This new copolymer is prepared from a reaction mixture which includes, in addition to styrene and the vinyl compound, a crosslinking agent and an initiator. Indeed, by careful preparation of the reaction mixture the glass transition temperature, $T_g$ of the resulting shape memory polymer can be synthesized to match the operating temperature of the contact lens manufacturing process.

In a preferred embodiment of the present invention, the reaction mixture includes, in addition to the first monomer, which is styrene, the second monomer, which is a vinyl compound other than styrene, the crosslinking agent, which is a multifunctional compound, and an initiator, a fifth component, a modifying polymer.

The second monomer, a vinyl compound other than styrene, is preferably vinyl neodecanoate, vinyl benzoate, vinyl propionate, vinyl stearate, a methylstyrene, which may be a mixture, 3-methylstyrene or 4-methylstyrene, a vinyl pyridine, which may be a mixture, 2-vinyl pyridine, 3-vinyl pyridine or 4-vinyl pyridine, vinyl laurate, vinyl butyrate, vinyl acetate, vinyl stearate, vinyl 2-furate, vinyl phenylacetate, vinyl carbazole, 4-vinylbenzyl acetate, 4-vinylbenzoic acid, vinyl methyl sulfone, vinyl octadecyl ether, vinyl isooctyl ether, N-vinyl-2-pyrrolidone, N-vinyl-N-methylacetamide, 1-vinylimidazole, N-vinylformamide, N-vinylcaprolactam, vinyl azolactone, N-vinylurea, 4-(vinyloxy)butyl stearate, 4-(vinyloxy)butyl benzoate, 4-(vinyloxymethyl)cyclohexylmethyl benzoate, methyl acrylate, methyl methacrylate, butyl acrylate, t-butyl acrylate, butyl methacrylate, t-butyl methacrylate, hexyl acrylate, acrylic acid, methacrylic acid, benzyl acrylate, benzyl methacrylate, 2-n-butoxyethyl methacrylate, 2-cyanoethyl acrylate, cyclohexyl acrylate, cyclohexyl methacrylate, decyl acrylate, dicyclopentenyl acrylate, dicyclopentenyloxyethyl acrylate, dicyclopentenyloxyethyl methacrylate, dodecyl acrylate, dodecyl methacrylate, 2-ethoxyethyl methacrylate, 2-ethylhexyl acrylate, ethyl methacrylate, 2-hydroxyethyl acrylate, 2-hydroxyethyl methacrylate, isobornyl acrylate, isobornyl methacrylate, 2-(2-methoxyethoxy)ethyl acrylate, 2-(2-methoxyethoxyl)-ethyl methacrylate, 2-methoxyethyl acrylate, 2-methoxyethyl methacrylate, 2-methoxypropyl acrylate, 2-methoxypropyl methacrylate, octyl methacrylate, 2-phenoxyethyl acrylate, 2-phenoxyethyl methacrylate, phenyl acrylate, 2-phenylethyl acrylate, 2-phenylethyl methacrylate, phenyl methacrylate, propyl acrylate, propyl methacrylate, stearyl acrylate, stearyl methacrylate, 2,4,6-tribromophenyl acrylate, undecyl acrylate or undecyl methacrylate.

Of the vinyl compounds preferred for use in the reaction mixture of the shape memory polymer of the present invention, vinyl neodecanoate, vinyl benzoate, vinyl propionate, vinyl stearate, a methylstyrene, 4-(vinyloxy) butyl stearate or a vinyl pyridine are particularly preferred.

The crosslinking agent of the shape memory polymer reaction mixture is multifunctional, that is, the crosslinking agent is a compound has a polymerizable functionality of at least 2. Indeed, difunctional crosslinking agents are preferred. Crosslinking agents within the scope of the present invention include diallyl fumarate, diallyl diglycol carbonate, allyl methacrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, ditrimethylolpropane tetraacrylate, divinyl glycol, divinyl sebacate, glycerol trimethacrylate, 1,5-haxadiene, 1,6-hexanediol diacrylate, 1,6-hexanediol diacrylate, 1,6-hexanediol dimethacrylate, N,N'-methylenebismethacrylamide, 1,9-nonanediol dimethacryalte, pentaerythritol tetraacylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, triethylene glycol divinyl ether, 1,1,1-trimethylolethane trimethacrylate, 1,1,1-trimethylolpropane diallyl ether, 1,1, 1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl)phosphate, 2,2-bis(4-methacryloxyphenyl)propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl] isophthalate, bis[4-(vinyloxymethyl)cyclohexylmethyl] glutarate, bis[-(vinyloxy)butyl]succinate, bis((4-((-vinyloxy)methyl)cyclohexyl)methyl)isophthalate, bis(4-(vinyloxy)butyl)terephthalate, bis[[(4-[vinyloxy)methyl) cyclohexyl]methyl]terephthalate, bis[4-vinyloxy)butyl] adipate, bis[4-(vinyloxy)butyl](methylenedi-1,4-phenylene) biscarbamate, bis[4-(vinyloxy)butyl](4-methyl-1,3-phenylene)biscarbamate, bis[4-(vinyloxy)butyl]1,6-hexanediylbiscarbamate or tris[4-(vinyloxy)butyl] trimellitate.

Of these preferred crosslinking agents, divinyl benzene, bis[4-(vinyloxy)butyl]terephthalate and bis[[4-[(vinyloxy)methyl]cyclohexyl]methyl terephthalate are particularly preferred. Of these, divinyl benzene is even more particularly preferred as the crosslinking agent.

The initiator of the reaction mixture may be a free radical or an ionic initiator. Free radical initiators within the scope of the present invention include organic peroxides and azo compounds. Although any of the commercially available organic peroxides may be utilized, tert-butyl peroxide, tert-butyl hydroperoxide, benzoyl peroxide, dicumyl peroxide and lauroyl peroxide are particularly preferred. Similarly, although any commercially available azo initiating compounds may be utilized, 2,2'-azobisisobutyronitrile is particularly preferred. The ionic initiators are preferably cationic initiators. Preferred cationic initiators include boron trifluoride, boron trifluoride diethyl etherate, aluminum trichloride and tin (IV) chloride.

As stated above, the SMP reaction mixture may include a fifth, optional component. This fifth component of the shape memory polymer reaction mixture is optional. That optional component is a modifying polymer. The modifying polymer acts as a viscosity adjustor and, additionally provides the requisite toughness to the resultant shape memory polymer. The requisite toughness of the cured shape memory polymer product is a toughness that meets the quantative requirements set forth in ASTM Standard Test Procedures D5045 and D6068.

The modifying polymer of the shape memory polymer reaction mixture is a thermoplastic polymer that is compatible with the polymer formed by the reaction product of styrene and a vinyl compound. Preferred compatible polymers include olefin polymers and styrene polymers. Particularly preferred compatible polymers include polystyrene, poly(styrene-co-butadiene), polyethylene and polypropylene. Of these, polystyrene is particularly preferred as the modifying polymer in the shape memory polymer reaction mixture.

The constituents of the shape memory polymer reaction mixture are present such that the styrene monomer constituent represents between about 30% to about 95%, the vinyl monomer constitutes between about 5% and about 60%, the crosslinking agent constitutes between about 0.5% and about 5%, the initiator is present in a concentration in the range of between about 0.1% and about 4% and the modifying polymer, if present, represents between about 0.5% and about 60%, all of the above recited percentages being by weight based on the total weight of the shape memory polymer reaction mixture.

Preferably, the constituents of the shape memory polymer reaction mixture are present in the following concentration ranges, again reported as percentage by weight, based on the total weight of the reaction mixture: styrene monomer, about 40% to about 85%; vinyl monomer, about 5% to about 20%; crosslinking agent, about 0.6% to about 3%; initiator, about 0.5% to about 3%; and modifying polymer, if present about 5% to about 50%.

More preferably, the constituents of the shape memory polymer reaction mixture include between about 50% and about 80% styrene monomer; between about 5% and about 14% vinyl monomer; between about 1% and about 2.5% initiator; and, if present, between about 10% and about 40% modifying polymer. As previously, these percentages are by weight, based on the total weight of the shape memory polymer reaction mixture.

The shape memory polymer reaction mixture is polymerized by reacting the mixture at a temperature in the range of between about 20° C. and about 150° C. and a pressure in the range of between about 14.7 psi and about 50 psi over a time period in the range of between about 2 seconds and 4 days to produce a crosslinked shape memory polymer In a preferred embodiment, the polymerization reaction, to produce thermosetting shape memory polymer of the present invention, occurs at a temperature in the range of between about 50° C. and about 110° C. and a pressure in the range of between about 14.7 psi and about 25 psi over a period of between about 1 minute and 3 days.

More preferably, the polymerization reaction conditions which the thermosetting shape memory polymer is formed from the shape memory polymer reaction mixture is a temperature in the range of between about 65° C. and about 75° C., a pressure in the range of about 14.7 psi over a range of between about 4 hours and about 1.25 days.

The shape memory phenomenon in the vicinity of Tg and the ability to set the value of Tg by varying the composition over a very broad range of temperatures allows contemplation of numerous applications in varied uses when thermoreversibility of a geometric shape is the desired aim. The following uses for the shape memory polymer of this invention are cited for guidance and in a non-restrictive manner:

molds for ophthalmic lens manufacturing, e.g. contact, spectacle or interocular lens manufacturing; a deformable surface of an agile mold, e.g. for the manufacture of ophthalmic lenses; molds for composite manufacturing; structural deployment devices for remote systems; games and toys; domestic articles; arts and ornamentation units; medical and paramedical instruments and devices; thermosensitive instruments and security devices; office equipment; garden equipment; educative articles; tricks, jokes and novelty items; building accessories; hygiene accessories; automotive accessories; films and sheets for retractable housings and packaging; coupling material for pipes of different diameters; building games accessories; folding games; scale model accessories; bath toys; boots and shoes inserts; skiing accessories; suction-devices for vacuum cleaners; pastry-making accessories; camping articles; adaptable coat hangers; retractable films and nets; sensitive window blinds; isolation and blocking joints; fuses; alarm devices; sculpture accessories; adaptable hairdressing accessories; plates for braille that can be erased; medical prosthesis; orthopedic devices; furniture; deformable rulers; and recoverable printing matrix.

The following examples are provided to illustrate the scope of the present invention. Because these examples are given for illustrative purposes only, the invention should not be deemed limited thereto.

EXAMPLE 1

A polymeric reaction mixture was formulated by mixing vinyl neodecanoate (7%), divinyl benzene (1%), and styrene (90%) in random order to yield a clear solution. Benzoyl peroxide (2%) was then added to the resulting solution (all composition % are by weight). The resulting solution was kept cold in a refrigerator before use. To prepare the shape memory polymer (SMP), the reaction mixture formulated above was injected by syringe into a mold fabricated with two 14" by 14" glass plates separated by Viton spacer. The two sheets of glass were held together by clamps around the edges. The Viton spacer also acts as sealant in the mold. The sample was then heated in an oven maintained at atmospheric pressure and a temperature of 75° C. for 24 hours. After the sample was cured for the specified period of time, it was removed from the oven and immediately transferred to a warm water bath. The temperature of water used was about 60° C. The SMP sheet formed was demolded under the warm water by applying a slight prying force at the edges of the mold. The released SMP sheet was then allowed to dry and cool down to room temperature.

At the conclusion of this polymerization process a clear sheet of a cured shape memory polymer was obtained.

EXAMPLE 2

A polymeric reaction mixture was formulated by mixing vinyl neodecanoate (7%), divinyl benzene (1%), and styrene (60%) in random order to form a colorless solution. Polystyrene granules (30%) were then added to the resulting solution. The resulting mixture was then allowed to sit at room temperature with occasional stirring until all the polystyrene granules were dissolved to give a clear, viscous solution. Benzoyl peroxide (2%) was then added to the resulting solution (all composition % are by weight). The resulting mixture was ultrasonicated at room temperature for 15 minutes to yield a clear solution. The resulting solution was kept cold in a refrigerator before use. To prepare the shape memory polymer (SMP), the reaction mixture formulated above was injected by syringe into a mold fabricated with two 14" by 14" glass plates separated by Viton spacer. The two sheets of glass were held together by clamps around the edges. The Viton spacer also acts as sealant in the mold. The sample was then heated at 75° C. at atmospheric pressure for 24 hours. After the sample was cured for the specified period of time, it was removed from the oven and immediately transferred to a warm water bath. The temperature of water used was about 60° C. The SMP sheet formed was demolded under the warm water by applying a slight prying force at the edges of the mold. The released SMP sheet was then allowed to dry and cool down to room temperature.

At the conclusion of this polymerization process a clear sheet of a cured shape memory polymer was obtained.

The above embodiment and examples are provided to illustrate the scope and spirit of the present invention. These embodiments and examples will make apparent, to those skilled in the art, other embodiments and examples. Those other embodiments and examples are within the contemplation of the present invention. Therefore, the present invention should be limited only by the appended claims.

What is claimed is:

1. A shape memory polymer comprising a modifying polymer, a reaction product of styrene, a vinyl compound other than styrene, about 0.5 to about 5% by weight of a multifunctional crosslinking agent and an initiator.

2. A shape memory polymer comprising a reaction product of styrene, a vinyl compound other than styrene, about 0.5 to about 5% by weight of a multifunctional crosslinking agent and an initiator, wherein said vinyl compound is vinyl neodecanoate, vinyl benzoate, vinyl propionate, vinyl stearate, a methylstyrene, 4-(vinyloxy)butyl stearate or a vinyl pyridine.

3. A shape memory polymer in accordance with claims 1 or 2, wherein said crosslinking agent is difunctional.

4. A shape memory polymer in accordance with claim 3 wherein said difunctional crosslinking agent is divinyl benzene, bis(4-(vinyloxy)butyl)terephthalate or bis(4-((vinyloxy)methyl)cyclohexyl)methyl terephthalate.

5. A shape memory polymer in accordance with claims 1 or 2, wherein said initiator is a free radical initiator or ionic initiator.

6. A shape memory polymer in accordance with claim 5 wherein said initiator is a free radical initiator.

7. A shape memory polymer in accordance with claim 6 wherein said free radical initiator is an organic peroxide.

8. A shape memory polymer in accordance with claim 5 wherein said initiator is a cationic initiator.

9. A shape memory polymer in accordance with claim 1 wherein said modifying polymer is a thermoplastic polymer compatible with said polymer formed by the reaction product of said styrene and said vinyl compound.

10. A shape memory polymer in accordance with claims 1 or 2, wherein said reaction mixture is polymerized at a temperature in the range of between about 20° C. and about 150° C. and a pressure in the range of between about 14.7 psi and 50 psi over a time period in the range of between about 2 seconds and about 4 days.

11. A shape memory polymer comprising a reaction product of styrene, a vinyl compound selected from group consisting of vinyl neodecanoate, vinyl benzoate, vinyl propionate, vinyl stearate, a methylstyrene, a vinyl pyridine and 4-(vinyloxy) butyl stearate, a difunctional crosslinking agent and a free radical or a cationic initiator.

12. A shape memory polymer in accordance with claim 11 wherein said difunctional crosslinking agent is selected from the group consisting of divinyl benzene, bis[4-(vinyloxy) butyl] terephthalate and bis[[(4-[vinyloxy)methyl] cyclohexyl]methyl] terephthalate.

13. A shape memory polymer in accordance with claim 12 wherein said free radical or cationic initiator is selected from the group consisting of t-butyl peroxide, t-butyl hydroxyperoxide, benzoyl peroxide, dicumyl peroxide, lauroyl peroxide, 2,2'-azobisisobutyronitrile, boron trifluoride, boron trifluoride diethyl etherate, aluminum trichloride and tin (IV) chloride.

14. A shape memory polymer in accordance with claim 13 wherein said reaction product includes a thermoplastic polymer compatible with the polymer formed by the reaction product of said styrene and said vinyl compound.

15. A shape memory polymer in accordance with claim 14 wherein said thermoplastic polymer is polystyrene or a polyolefin.

16. A shape memory polymer in accordance with claim 13 wherein said vinyl compound is vinyl neodecanoate, said difunctional crosslinking agent is divinyl benzene and said initiator is selected from the group consisting of dicumyl peroxide, benzoyl peroxide and lauroyl benzene.

17. A shape memory polymer in accordance with claim 16 wherein said reaction product includes polystyrene.

18. A shape memory polymer in accordance with claim 11 wherein said styrene comprises between about 30% and about 95%; said vinyl compound comprises between about 5% and about 60%; said difunctional crosslinking agent comprises between about 0.5% and about 5% and said initiator comprises between about 0.1% and about 4%, said percentages being by weight, based on the total weight of said shape memory polymer reaction mixture.

19. A shape memory polymer in accordance with claim 14 wherein said styrene comprises between about 40% and about 85%; said vinyl compound comprise between about 5% and about 20%; said difunctional crosslinking agent comprises between about 0.6% and about 3%; said initiator comprises between about 0.5% and about 3%; and said thermoplastic comprises between about 5% and about 50%, said percentages being by weight, based on the total weight of said shape memory polymer reaction mixture.

20. A shape memory polymer comprising a reaction product of styrene, a vinyl compound other than styrene, a multifunctional crosslinking agent, an initiator and a modifying polymer.

21. A shape memory polymer in accordance with claim 20 wherein said vinyl compound is vinyl neodecanoate, vinyl benzoate, vinyl propionate, vinyl stearate, a methylstyrene, 4-(vinyloxy)butyl stearate or a vinyl pyridine.

22. A shape memory polymer in accordance with claim 20 wherein said crosslinking agent is difunctional.

23. A shape memory polymer in accordance with claim 22 wherein said difunctional crosslinking agent is divinyl benzene, bis(4-(vinyloxy)butyl)terephthalate or bis(4-((vinyloxy)methyl)cyclohexyl)methyl terephthalate.

* * * * *